March 23, 1965   J. A. NELSON   3,174,558
COMBINATION CULTIVATING AND FURROWING TOOL
Filed Sept. 6, 1962
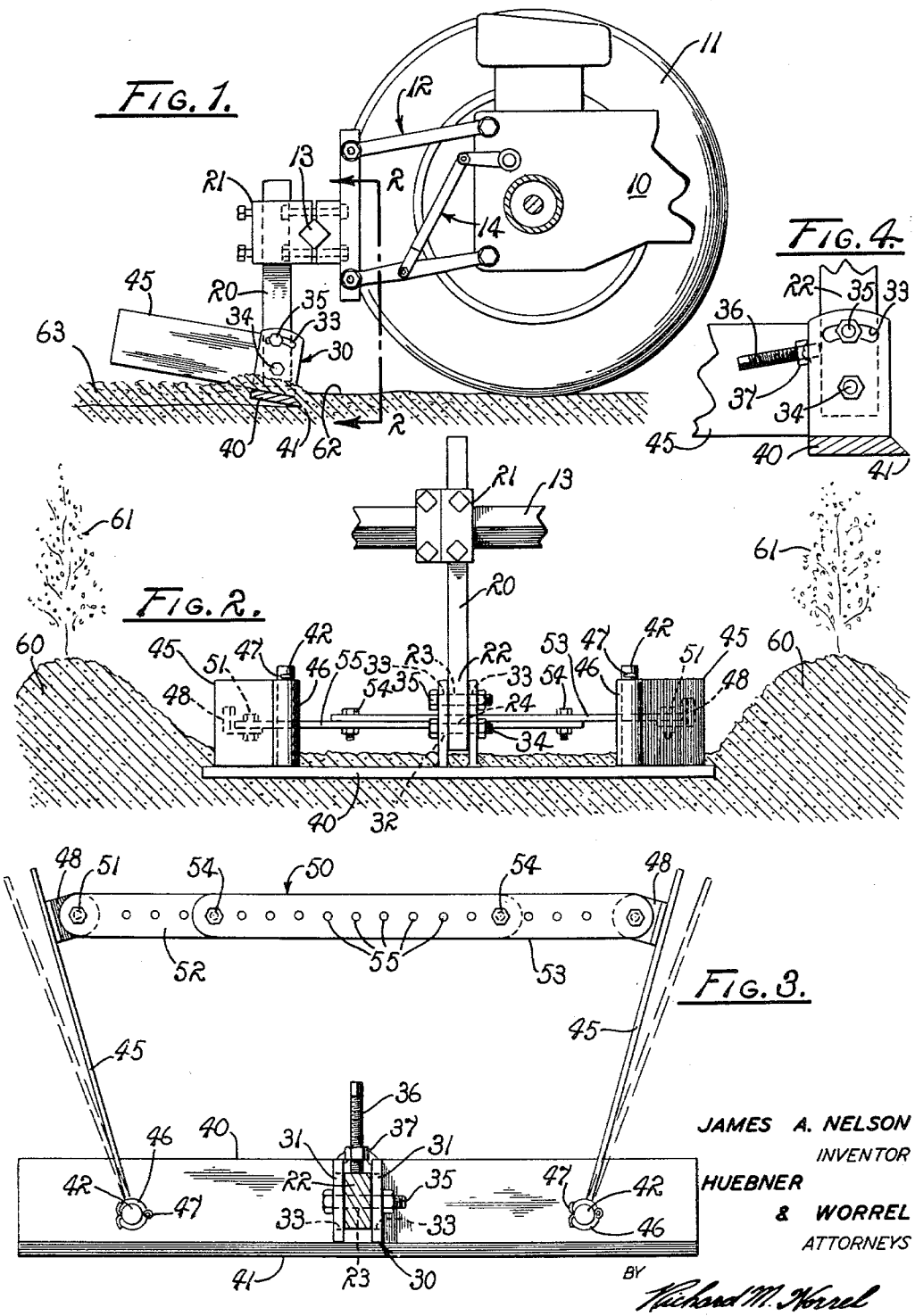
JAMES A. NELSON
INVENTOR
HUEBNER
& WORREL
ATTORNEYS
BY
Richard M. Worrel United States Patent Office 3,174,558
Patented Mar. 23, 1965

3,174,558
COMBINATION CULTIVATING AND FURROWING TOOL
James A. Nelson, Rte. 4, Box 26, Porterville, Calif.
Filed Sept. 6, 1962, Ser. No. 221,786
4 Claims. (Cl. 172—722)

This invention relates to a combination cultivating and furrowing tool. It particularly relates to such a tool employed in the tillage of soil which is irrigated by surface application of water through shallow ditches or furrows.

The tool of the present invention has utility in the cultivation of soil and the formation therein of irrigation furrows in connection with the growing of a variety of agricultural crops. It is particularly adapted for use in performing soil tilling operations desired in the production of row crops, such as cotton, sugar beets, and the like and is conveniently described in connection with such use.

In the practice of irrigation by surface methods in which the water is distributed through a system of shallow ditches or furrows, a furrow considered ideal is one which presents a maximum soil surface to the irrigation water to enhance the absorption rate as the water percolates to the sub-soil. In addition, the surface of the shallow furrow should be cultivated or otherwise tilled to provide granular soil fragments or particles to further enhance the absorption of the irrigation water. Such cultivation, however, should not be so deep as to harm shallow roots of the growing crops.

In the growing of row crops to which moisture is supplied by a surface irrigation method, the field is prepared with a plurality of spaced, longitudinally extended, crested seedbeds, arranged on opposite sides of alternately interspersed irrigation furrows. Many conventional tools exist which form the crested seedbeds during the planting of the crop. During the growing season, it is frequently necessary to cultivate the surface of the soil in the irrigation furrow between such seedbeds to remove undesirable plant growth. It is also desirable to maintain the configuration of the seedbeds and to provide a relatively flat water course in the shallow furrow extending between the seedbeds.

In the growing of certain types of row crops, it is a present practice to form the shallow water course with one tool and to cultivate and till the surface of the furrow with a separate tool.

Accordingly, it is an object of the present invention to provide a combination cultivating and furrowing tool adapted to form a shallow flat-bottomed water course in a field to be irrigated.

Another object is to provide a combination cultivating and furrowing tool in which the cultivating portion of the tool is selectively adjustable to provide a variety of cultivating actions.

Another object is to provide a cultivating and furrowing tool to form a shallow irrigation furrow of predetermined width in which the furrow-forming portions maintain the predetermined width even though a lateral obstruction is encountered at one side or the other of the furrow.

Another object is to provide a tool specifically adapted for cultivating row crops and forming shallow irrigation furrows therebetween, the tool being ideally suited for use with existing agricultural tractors.

These, together with other objects, will become more fully apparent upon reference to the following description and accompanying drawings.

In the drawings:

FIG. 1 is a fragmentary side elevation of a conventional agricultural tractor of the row crop type on which is mounted a combination cultivating and furrowing tool incorporating the principles of the present invention.

FIG. 2 is an enlarged front elevation of the tool of the present invention taken from a position indicated by the arrows 2—2 in FIG. 1 and showing the tool in use in connection with cultivation and furrow formation between two longitudinally extended crested seedbeds.

FIG. 3 is a further enlarged top plan view of the tool showing the furrow-forming side plates in a laterally extended adjusted position, as indicated by the dashed lines.

FIG. 4 is a fragmentary view of a pitch adjustment structure incorporated in the tool, drawn to the scale of FIG. 3.

Referring to the drawings, a conventional agricultural tractor is fragmentarily illustrated in FIG. 1 and includes a chassis 10 on which is mounted a pair of rear drive wheels, one of which is shown at 11. A draft linkage, generally indicated at 12, is carried at the rear of the tractor to support a tool bar 13 extended transversely of the longitudinal axis of the tractor. A lifting mechanism, schematically illustrated at 14, is provided to permit selective elevational adjustment of the tool bar.

A tool shank 20 is carried on the tool bar 13 in a manner to permit both vertical and transverse adjustment by means of a mounting clamp 21. As such, the shank and the mounting clamp constitute means to support the earth engaging portions of the tool of the present invention. The tool shank is vertically extended and includes a lower end 22 in which are provided upper and lower transverse bores 23 and 24.

A tool mounting bracket 30 is provided having laterally opposed upstanding lugs 31 with a lower bore 32 aligned with the lower bore 24 in the shank. An arcuate slot 33 provided in each of the lugs is disposed in transverse alignment with the upper bore 23 of the shank. A lower pivot pin 34 received in the lower bores 24 and 32 permits angular adjustment of the mounting bracket about a horizontal axis with respect to the shank 20. An upper adjustment bolt 35 received in the upper bore 23 and the arcuate slots 33 maintains desired degree of angular pitch adjustment. An adjustable stop carried on the bracket facilitates such angular adjustment and includes a setscrew 36 threadably received in a nut 37 welded to the opposed lugs 31. It will be observed that the setscrew 36 is adapted to engage the lower end of the shank to facilitate angular adjustment between the mounting bracket and the shank.

A cutting blade 40 in the form of a substantially flat rigid plate has a forward cutting edge 41 and a pair of laterally opposed upstanding posts 42. The plate is secured at its center to the mounting bracket 30, as by welding, and each of the posts is secured to the plate to provide respective pivotal axes substantially normal to the plane of the cutting blade.

Two laterally opposed wing plates 45 are each respectively pivotally connected to the cutting blade by means of individual tubular collars respectively secured to each of the plates and adapted for rotatable mounting on one of the pivot posts 42. Each of the collars is retained on its respective post by means of a key 47 retained in a suitable bore in the upper end of the post. Each of the wing plates is a plane member, preferably substantially rigid both longitudinally and transversely for a purpose subsequently to be described. At the free end of each of the plates, an attachment ear 48 is rigidly secured thereto. An extensible strut 50 pivotally interconnects the ears 48 by means of pins 51 received in suitable bores. The extensible strut includes opposed brace members 52 and 53, each pivotally connected to a respective wing plate at one end and having its other end rigidly connected to the other brace member, as by means of bolts 54 received in aligned pairs of a plurality of suitable adjustment bores 55 in said members.

As illustrated in FIGS. 1 and 2, the tool is particularly adapted for use with opposed longitudinally extended seedbeds, indicated at 60. The seedbeds are crested in transverse configuration and a plurality of longitudinally spaced plants 61 are cultivated to maturity while growing at the crests of the seedbeds.

Operation

The operation of the described embodiment of the subject invention is believed to be readily apparent and is briefly summarized at this point. In cultivating such row crops, as discussed above, the tool of the present invention is mounted substantially as shown in FIG. 1, and the angle of pitch of the plane of the cutting blade 40 is selectively adjusted, depending upon the depth of penetration of the blade, the type of soil surface desired following cultivation, or the extent of lifting of the engaged soil and weeds desired. As illustrated, the cutting edge 41 of the blade is disposed at a shallow depth below the surface 62 of the soil by means of the lifting mechanism 14. The pitch angle of the blade may be selected by loosening the adjustment bolt 35, positioning the setscrew 36 which serves as a stop when engaging the lower end 22 of the shank, and subsequently securing the bolt 35 to maintain the selected pitch angle.

It can be seen that as the tractor 10 travels along a row of plants 61, the tool parallels adjacent rows of said seedbeds. Obviously, several of the tools may be mounted on a tool bar 13 in transversely spaced relationship so that more than one furrow can be cultivated and formed at the same time. During ground traversing movement of the tractor, the surface of the soil is cultivated. This cultivation effectively destroys any unwanted vegetation growing between adjacent row crops, and the cultivated surface, indicated at 63, is broken into small particles and left in a fragmented condition referred to as a mulch. The degree of breaking and fracturing incident to passage of the cultivating blade at a shallow depth below the soil surface can be adjustably selected by varying the pitch angle of the blade. The optimum adjusted pitch angle varies with the type of soil being cultivated, and obviously, a minimum amount of fracturing occurs if the blade is adjusted to operate in a substantially horizontal plane.

The wing plates 45 are adjusted in a rearwardly divergent relationship, as illustrated in FIG. 3, so that the trailing ends of the plates determine the transverse dimensions of the irrigation furrow. It should be noted that the wing plates 45 are adapted to swing in unison on the mounting posts 42 by means of the extensible strut 50 pivotally interconnecting the trailing ends of the plates. According, if an obstruction, such as a hardened mass of soil, is encountered by one of the plates, the plates are free to swing in unison so that the transverse dimension of the irrigation furrow remains substantially constant throughout the longitudinal extent of the furrow. This is important so that a restriction is not formed in the furrow which would vary the rate of flow between different furrows. It also permits the plates to slide past encountered plants or other obstructions with a minimum of damage thereto.

In the event that it is desired to widen the furrows, the extensible strut 50 permits, by successive uses of the tool, a progressive incremental increase in the transverse dimension of the furrow. This is accomplished by increasing the effective length of the extensible strut and positioning the wing plates 45 as illustrated by the dashed lines in FIG. 3. Conversely, if the plates are aligned with the direction of travel, a weeding and soil surface cultivating action is achieved but with no furrow formation. When the strut is contracted so that the plates rearwardly converge, they form a central ridge bounded by two flat-bottom furrows. Significantly, in all adjusted positions, the plates are free to swing laterally in accommodation to encountered obstructions causing imbalance of drag imposed thereon.

It has been observed in practice that fields so cultivated with the present tool are able to absorb irrigation water at a higher rate and that the linear progress of the water along a furrow is at a slower rate. This latter characteristic indicates a higher rate of water absorption and also prevents undesired erosion of the water course provided by the irrigation furrow. When a growing field has been irrigated by the use of shallow furrows formed by the present tool, it has been observed that such a field has been able to hold the water so absorbed during a single irrigation for a period of time substantially longer than that observed when irrigated through conventional irrigation furrows of a generally V-shaped cross-section.

Accordingly, in practice, the tool of the present invention permits concurrent cultivation of a field in which row crops are growing and the formation of shallow flat-bottomed irrigation furrows which renders the surface of the soil so cultivated in a condition particularly well suited for the rapid absorption of irrigation water.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An earthworking tool comprising an elongated blade, means mounting the blade for earth traversing cultivating movement disposed substantially horizontally transversely of a predetermined path of travel so as to mulch the soil in a swath of predetermined width, a pair of wing members having predetermined forward and rearward end portions, means pivotally mounting the forward end portions of the wing members on the blade for pivotal movement about substantially erect transversely spaced axes with the forward end portions of the members spaced to permit the passage of cultivated soil therebetween and with the members disposed within the swath of the blade for engagement with soil mulched thereby, and telescopically adjustable means pivotally interconnecting the wing members in rearwardly spaced relation to their pivotal axes permitting selective transverse shifting of soil mulched by the blade and engaged by the swing members by regulation of the relative angularity of said members.

2. An earthworking tool comprising an elongated longitudinally substantially flat blade, means mounting the blade for earth traversing movement in ground engagement disposed substantially horizontally transversely of a predetermined path of travel so as to mulch the soil in a swath of predetermined width, a pair of elongated transversely substantially flat wing members having predetermined forward and rearward end portions, and means mounting the forward end portions of the wing members on the blade in transversely substantially erect positions with their rearward end portions divergently rearwardly extended, the wing members being disposed in the swath of the blade during earth traversing movement so as to shift portions of the soil mulched by the blade laterally to form a pair of ridges defining a furrow therebetween and the forward end portions of the wing members being spaced to permit the passage of mulched soil therebetween into the furrow.

3. A combination cultivating and furrowing tool adapted for movement along a predetermined path of travel so as to cultivate and furrow the soil in a swath of predetermined width comprising an elongated rigid flat blade having a cutting edge; means supporting the blade to dispose the cutting edge in a substantially horizontal plane and transversely of the path; a pair of wing members spaced transversely of said path; and means mounting the wing members on the blade for pivotal movement about respective substantially vertical axes, said members being disposed within the swath of the blade for engagement with soil cultivated thereby.

4. A combination cultivating and furrowing tool adapted for movement along a predetermined path of travel so as to cultivate and furrow the soil in a swath of predetermined width comprising a tool supporting shank; an elongated rigid substantially flat blade having a forwardly presented cutting edge; means mounting the blade on the shank to dispose the cutting edge transversely of the path and substantially horizontally; a pair of laterally opposed wing members having predetermined forward and rearward end portions; and means mounting the wing members on the blade for adjustable pivotal movement about respective substantially vertical axes, said members being disposed in transversely spaced relation within the swath of the blade for engagement with soil cultivated thereby, said rearward end portions being disposed in rearwardly extended relation from said axes.

References Cited by the Examiner

UNITED STATES PATENTS

| | | | |
|---|---|---|---|
| 160,545 | 3/75 | Robson | 172—722 |
| 864,657 | 8/07 | Lancaster | 172—720 X |
| 2,345,702 | 4/44 | Noble | 172—698 |
| 2,673,511 | 3/54 | Roberts | 172—722 |
| 2,893,499 | 7/59 | Shollenberger | 172—698 X |
| 3,022,836 | 2/62 | Bechman | 172—698 |

SAMUEL KOREN, *Primary Examiner.*

A. JOSEPH GOLDBERG, *Examiner.*